United States Patent [19]
Wittle et al.

[11] Patent Number: 6,075,806
[45] Date of Patent: Jun. 13, 2000

[54] COAXIAL ELECTRODE ASSEMBLY HAVING INSULATING SPACERS

[75] Inventors: J. Kenneth Wittle, Chester Springs; Richard A. Hamilton, Aston; Peter James Wilver, Valley Township Montour County, all of Pa.

[73] Assignees: Electro-Pyrolysis Inc, Wayne; Svedala Industries Inc., Danville, both of Pa.

[21] Appl. No.: 09/221,633

[22] Filed: Dec. 23, 1998

[51] Int. Cl.$^7$ ...................................................... H05B 7/06
[52] U.S. Cl. .................................. 373/91; 373/82; 373/92
[58] Field of Search ................................. 373/88, 91, 92, 373/51, 52, 53, 82

[56] References Cited

U.S. PATENT DOCUMENTS

| | | |
|---|---|---|
| 3,546,348 | 12/1970 | DeCorso . |
| 4,039,738 | 8/1977 | Beskin et al. . |
| 4,776,598 | 10/1988 | Titus et al. . |
| 5,467,366 | 11/1995 | Wilhelmi et al. . |
| 5,673,285 | 9/1997 | Wittle et al. . |

OTHER PUBLICATIONS

"Advanced Technical Ceramics", Ceradyne, Inc. (2 sheets).
Report PNL–SA–21891 to U.S. Dept. of Energy, Surma, J.E. et al., "Graphite Electrode DC Arc Technology Development for Treatment of Buried Wastes", Tucson, Arizona, Feb. 28–Mar. 1993.

"Advanced Technical Ceramics", Ceredyne, Inc. (2 sheets).

Chart, "Custom Made Technical Ceramics for Electrical and Electronic Uses", National Ceramic Company.

"Fiberfrax Ceramic Fiber Insulation for Use to 2600 ° F (1430 ° C)", Carborundum Company, Jun. 1977.

"Fiberfrax Duraboard Products, Product Specification", Carborundum Company, Sep. 1990.

Chart, "R–21 Mullite" ER Advanced Ceramics.

Chart, "Material Properties", LSP Industrial Ceramics.

*Primary Examiner*—Tu Ba Hoang
*Attorney, Agent, or Firm*—Dann, Dorfman, Herrell and Skillman, P.C.

[57] ABSTRACT

In an arc furnace or melter furnace employing concentric graphite inner and outer electrodes, the accumulations of tolerances, distortion and mechanical forces can cause a loss of concentricity leading to reduced performance and eventually to electrode degradation. To avoid that condition, a plurality of insulating spherical or cylindrical spacers are disposed in the annular gap between the inner and outer electrodes. The spacers are held in position by arcuate recesses in the outer surface of the inner electrode or in the inner surface of the outer electrode. The electrodes may be constructed in segments that are assembled by threading one segment into another segment.

54 Claims, 7 Drawing Sheets

COAXIAL ELECTRODE ASSEMBLY HAVING INSULATING SPACERS

The present invention relates to coaxial electrodes and in particular to coaxial electrodes having spacers for maintaining the electrodes in coaxial relationship.

The use of concentric or coaxial tubular electrodes for the high temperature processing of materials, such as for processing waste materials or for refining, is known. U.S. Pat. No. 5,673,285 entitled "Concentric Electrode DC Arc Systems and Their Use in Processing Waste Materials" issued to J. K. Wittle et al., which is hereby incorporated herein by reference in its entirety, describes such a system. FIG. 4 of Wittle et al. shows a clamping assembly 114 for holding an inner electrode 24 and an outer electrode 22 in concentric relationship by clamps 74 and 72, respectively, clamping them at their respective upper ends. In FIG. 3 of Wittle et al. it can be seen that the electrode assembly 20 including concentric electrodes 22 and 24 projects into the processing chamber 80b of DC arc furnace 80. While the arrangement of Wittle et al. provides an excellent clamping arrangement, in certain applications, the concentric electrodes may be quite long as compared to their diameter and so are susceptible to misalignment, i.e., to deviation from the desired concentric relationship at locations far from the ends at which they are clamped. Such undesirable misalignment can occur as a result of variations in the shape of each electrode due to tolerance and part-to-part variation, or due to uneven heating while in operation, or due to forces arising from the electrode contacting the melt or solids within the arc furnace, including transient conditions in the melt. Moreover, the arrangement of Wittle et al. holds the outer and inner electrodes in fixed axial relationship whereas in some applications it is desirable that the inner electrode be moveable in an axial direction with respect to the outer electrode.

Accordingly, there is a need for a coaxial electrode assembly having reduced tendency for misalignment in the concentricity or coaxiality relationship between the electrodes and, further, that will permit the relative axial movement of one electrode with respect to the other. The electrode assembly of the present invention comprises a first electrode comprising a hollow cylinder and a second electrode comprising a cylinder and positioned coaxially within the first electrode. The first and second electrodes thereby define an annular cavity. The first electrode is maintained substantially coaxial with the second electrode by a plurality of spacers having a circular cross-section and disposed between the first and second electrodes in the annular cavity.

DESCRIPTION OF THE PREFERRED EMBODIMENTS

The detailed description of the preferred embodiments of the present invention following will be more easily and better understood when read in conjunction with the FIGURES of the included drawing described above.

Figure 1:
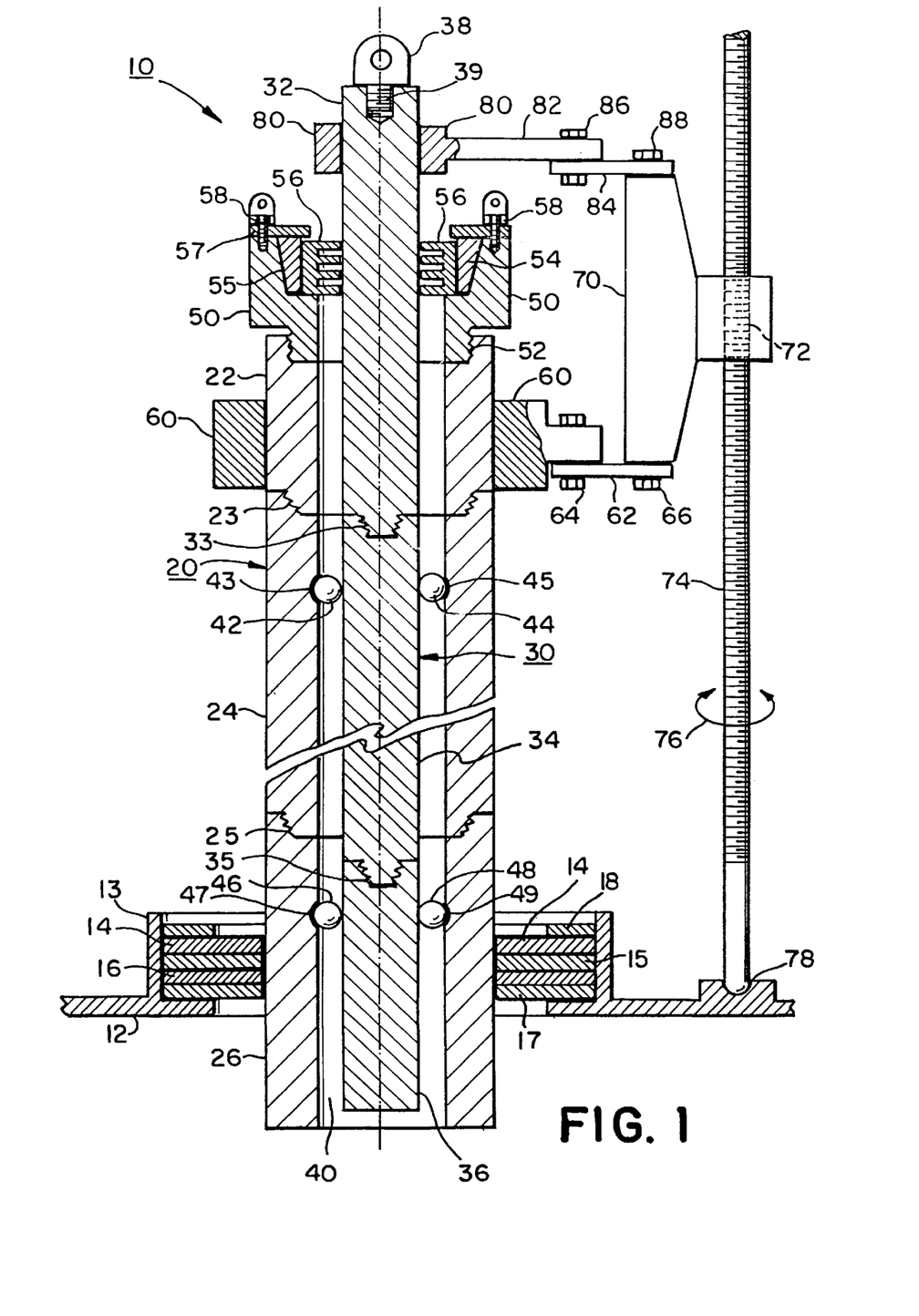
FIG. 1 is a schematic diagram, partially cut away and partially sectioned, of an embodiment of a coaxial electrode assembly including the present invention.

In FIG. 1, electrode assembly 10 includes hollow outer electrode 20 having an axial cylindrical cavity therein and cylindrical inner electrode 30 disposed coaxially within the cylindrical cavity of outer electrode 20, thereby to define a cylindrical annular cavity or gap 40 therebetween. The upper ends of outer electrode 20 and inner electrode 30 are maintained in coaxial relationship by seal holder 50 and insulating labyrinth seal 56 which will be described in detail below. The respective lower ends or tips of outer electrode 20 and inner electrode 30 project through roof wall 12 of an arc furnace into the processing chamber thereof. Annular wall 13 positions a plurality of insulating seals 14, 15, 16, 17 for sealing the opening in wall 12 of the arc furnace where the electrode assembly 10 passes therethrough. Insulating seals 14, 15, 16, 17 are clamped in place by annular metal clamping disk 18 which is held in place by a plurality of bolts (not shown). These insulating clamping disks 14, 15, 16, 17 form a seal with the outer surface of outer electrode 20 to seal the roof wall 12 of the processing chamber of the arc furnace so that a processing atmosphere may be maintained therein.

Hollow outer electrode 20 includes a plurality of hollow outer electrode segments 22, 24 and 26 which are held together in threaded engagement 23, 25 including tapered internal threads on one end of outer electrode segments 22, 24 and 26 and external tapered threads on one end of outer electrode segments 22 and 24.

Inner cylindrical electrode 30 includes a plurality of cylindrical inner electrode segments 32, 34, 36 which are joined together by threaded engagements 33, 35, respectively, formed of tapered internal threads at one end of one electrode segment that are sized to engage the external tapered threads on the other end thereof, and thus the threads on the end of another like inner electrode segment. Inner electrode 30 has lifting eye 38 in threaded engagement 39 therewith for lifting inner electrode vertically in relation to wall 12 of the arc furnace and in relation to outer electrode 20. Inner electrode 30 is preferably longer than outer electrode 20 to facilitate attachment of electrical power cables to inner electrode 30.

Because each segment has an internal thread on one end thereof and an external thread on the other end thereof that are sized to engage each other and therefore will engage the corresponding threads on other like segments, convenient attachment, interchangeability and replacement of like electrode segments is promoted. These threads may be of fixed diameter or have a taper as shown in FIG. 1.

In accordance with the present invention, a plurality of insulating spacers 42, 44, 46, 48 are disposed in the cylindrical annular cavity 40 between outer electrode 20 and inner electrode 30 for maintaining an annular gap 40 and thereby preventing electrodes 20 and 30 from touching and forming an electrical short circuit. It is preferred to maintain outer electrode 20 and inner electrode 30 in a substantially coaxial relationship. Each of insulating spacers 42, 44, 46, 48 are received into engaging features in the inner surface of outer electrode 20 or in the outer surface of inner electrode 30. In the arrangement of FIG. 1, for example, insulating spacer 42 is positioned in arcuate cavity 43, insulating spacer 44 is positioned in arcuate cavity 45, insulating spacer 46 is positioned in arcuate cavity 47 and insulating spacer 48 is positioned in arcuate cavity 49. Each of insulating spacers 42, 44, 46, 48 has a circular cross-section as may be obtained from a spacer having a spherical, cylindrical, barrel, or elliptical shape. It is noted that the diameter of insulating spacers 42, 44, 46, 48 is preferably greater than the radial dimension of cylindrical annular gap 40.

While the arcuate pockets in which the insulating spacers are positioned may be formed in the outer electrode 20 as shown in FIG. 1 or in the inner electrode 30, it is noted that cavities formed in the outer surface of the inner electrode 30 provide for ease of assembly whereas cavities formed on the inner surface of the outer electrode 20, while slightly more difficult to manufacture, result in a lesser decrease in the strength of the electrode into which they are formed.

Seal holder 50 is in threaded engagement 52 with the internal threads at the upper end of hollow outer electrode 20 and holds outer electrode 20 and inner electrode 30 in coaxial relationship. To that end, coaxial cavity 55 of seal holder 50 receives an insulating annular labyrinth seal ring 56 having a plurality of inwardly extending circular edges engaging the outer surface of inner electrode 30. Labyrinth seal 56 is wedged in place by annular conical wedge 54. Conical wedge 54 and labyrinth seal 56 are held in place by annular clamp ring 57 which is held in place, for example, by a plurality of bolts 58. Bolts 58 may include lifting eyes as shown in FIG. 1 for supporting and lifting outer electrode 20. Labyrinth seal 56 forms a seal for the annular cavity 40 between the interior surface of outer electrode 20 and the exterior surface of inner electrode 30 so that gases from the processing chamber of the arc furnace do not escape via the cylindrical annular gap 40, and also electrically insulates inner electrode 30 and outer electrode 20.

As thus far described, the coaxial electrode assembly 10 includes a hollow outer electrode 20 and an cylindrical inner electrode 30 held in coaxial relationship by a plurality of insulating spacers 42, 44, 46, 48, and by the arrangement of insulating labyrinth seal 56 in seal holder 50.

Electrode assembly 10 is supported and is inserted into the processing chamber of an arc furnace and withdrawn from the processing chamber by a clamping and drive arrangement as will now be described. Circumferential clamp 60 engages the outer surface of hollow outer electrode 20 and extends radially where it is attached to insulating link 62 by bolt and nut 64. Insulating link 62 is attached to a vertical yoke 70 by bolt 66. Yoke 70 also supports inner electrode 30 which is held by circumferential clamp 80 having a radially outwardly extending arm 82 to which insulating link 84 is attached by bolt and nut 86. Insulating link 84 is also attached to yoke 70 by bolt 88. It is noted that bolts 66 and 88 may be separate bolts engaging respective threaded holes in yoke 70 or maybe a single bolt and nut passing through a hole through yoke 70. Yoke 70 includes a threaded hole 70 through which passes a threaded drive rod 74 in threaded engagement therewith. Drive rod 74 is rotatable in either clockwise or counter clockwise direction as is indicated by the double ended arrow 76 and is rotatably mounted and supported at its lower end, for example, as by a ball and cup arrangement 78. Threaded drive rod 74 may be rotated by a crank or by an electric motor (not shown) coupled, for example, to its upper end.

In operation, threaded rod 74 is rotated in one direction to cause yoke 70 to move toward the roof wall 12 of the arc furnace thereby inserting electrode assembly 10 further into the processing chamber thereof or is rotated in the opposite direction to move yoke 70 away from roof wall 12, thereby to withdraw electrode assembly 10 from the processing chamber. If it is desired to move inner electrode 30 axially with respect to outer electrode 20, inner electrode 30 is supported at lifting eye 38 while clamp 80 is loosened. Then inner electrode 30 is raised or lowered, such as by a chain hoist or a rack and pinion drive, to the desired position at which clamp 80 is again tightened to secure the relative axial relationship of outer electrode 20 and inner electrode 30. Lifting eye 38 and/or lifting eye bolts 58 may also be used to support and then to lift coaxial electrode assembly 10 once it has been disengaged from yoke 70 and threaded drive rod 74.

Figure 2:
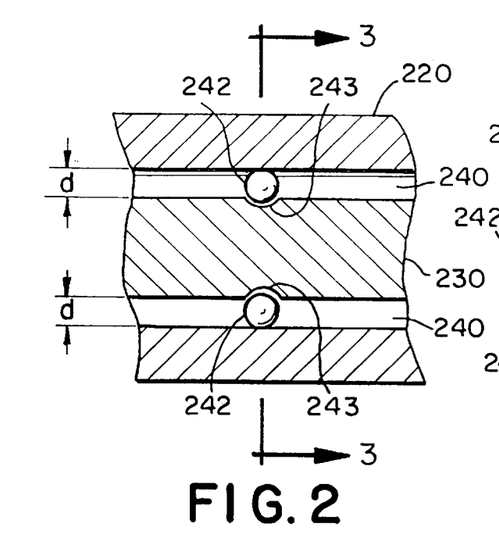
FIG. 2 is a diagram of an axial section of a modified portion of the embodiment of FIG. 1.

In FIG. 2 is shown a sectional view of a portion of hollow outer electrode 220 with cylindrical inner electrode 230 coaxially disposed therein to form annular cavity 240. In this modified arrangement, arcuate cavities 243 are formed in the exterior surface of inner electrode 230 to receive insulating spacers 242 therein. Insulating spacers 242 have a circular cross-section having a diameter that is greater than the radial dimension "d" of annular cavity 240. The radial dimension of annular cavity 240 is equal to one half of the difference between the inner diameter of outer electrode 220 and the outer diameter of inner electrode 230. The plurality of insulating spacers 242 are preferably arranged about the periphery of inner electrode 230 substantially in a plane that is perpendicular to a central or axial axis of outer electrode 220 and of inner electrode 230.

Figure 3:
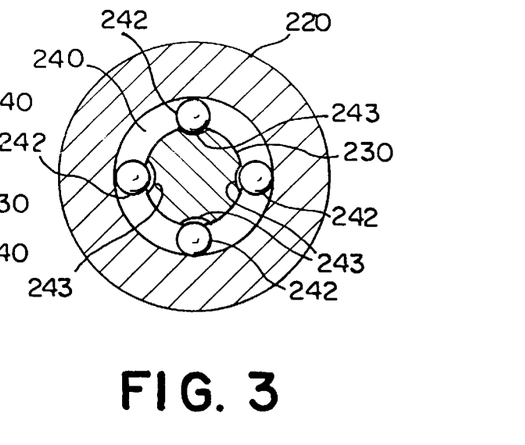
FIG. 3 is a diagram of a cross-section of the embodiment of FIG. 2.

FIG. 3 is a cross-sectional view of the arrangement of FIG. 2 taken at section line 3—3 and showing four spherical insulating spacers 242 evenly spaced about inner electrode 230 in annular cavity 240. In this arrangement, the engaging features 243 are preferably in the shape of a portion of a sphere. It is further preferred that the radius of curvature of arcuate cavities 243, i.e. the radius of the spherical cavity, be greater than the radius of spherical insulating spacer 242 so as to reduce any tendency of spacers 242 to bind against inner electrode 230 and outer electrode 220, thereby to allow ease of relative motion therebetween, particularly in the axial direction.

Figure 4:
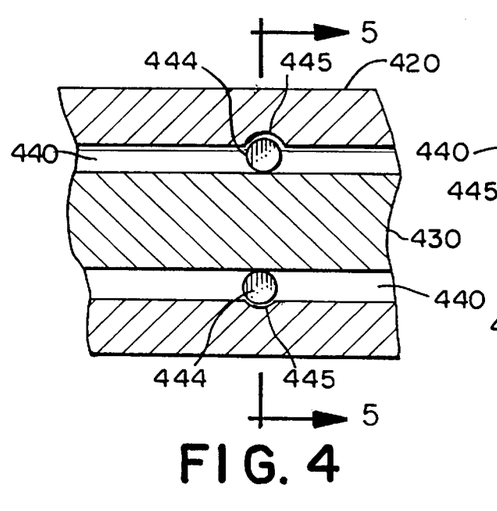
FIG. 4 is a diagram of an axial section for a portion of the embodiment of FIG. 1.

FIG. 4 is a sectional view of the portion of the embodiment of FIG. 1 in which insulating spacers 444 are disposed in annular cavity 440 between outer electrode 420 and inner electrode 430. In this arrangement, arcuate cavities 445 are formed in the inner cylindrical surface of outer electrode 420, as were arcuate cavities 43, 45, 47, 49 of FIG. 1. In all other respects, the arrangement of FIG. 4 is similar to that of FIG. 2.

Figure 5:
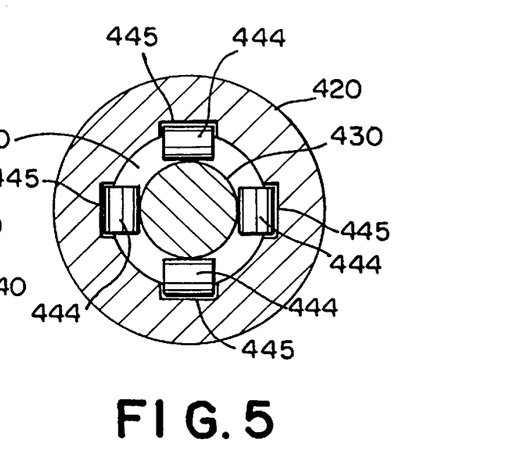
FIGS. 5, 6, 7, and 8 are diagrams of cross-sections of the embodiments of FIGS. 2 and 4.

FIG. 5 is a cross-section of the arrangement of FIG. 4 taken at section line 5—5. FIG. 5 shows cylindrical insulating spacers 444 positioned in cylindrical cavities 445 and preferably evenly spaced about the periphery of inner electrode 430 and the inner surface of outer electrode 420 in annular gap 440. It is preferred that the radius of curvature of the cylindrical cavities 445 be greater than the radius of the cylindrical insulating spacer 444 so as to reduce any tendency to bind as described above.

Figure 6:
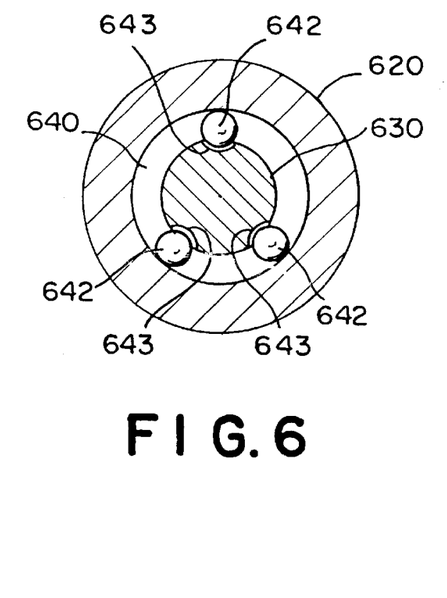

FIG. 6 is a cross-sectional view similar to that of FIG. 3 except that three insulating spacers 642 are employed rather than four insulating spacers 242 as in FIG. 3. This is similar in that spherical insulating spacers 642 reside in arcuate cavities 643 formed in the exterior surface of inner electrode 630 and are disposed in the annular cavity 640 between inner electrode 630 and outer electrode 620.

Figure 7:
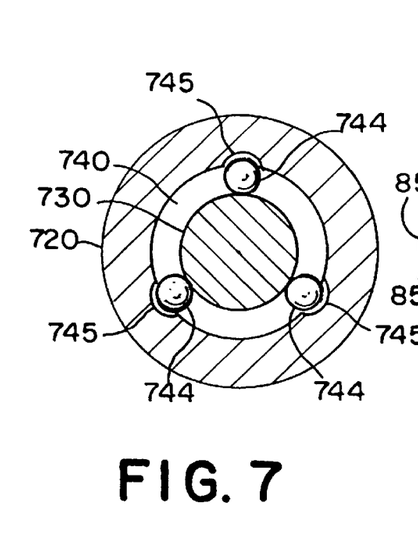

FIG. 7 is a cross-sectional view similar to that of FIG. 6 except that the three spherical insulating spacers 744 reside in arcuate cavities 745 in the interior surface of outer electrode 720 rather than in the arcuate cavities 643 in the exterior surface of inner electrode 630 in FIG. 6. Insulating spacers 744 preferably have diameters greater than the radial dimension of annular cavity 740 in which they are disposed, and arcuate cavities 745 preferably have a radius of curvature greater than the radius of spacers 744.

Figure 8:
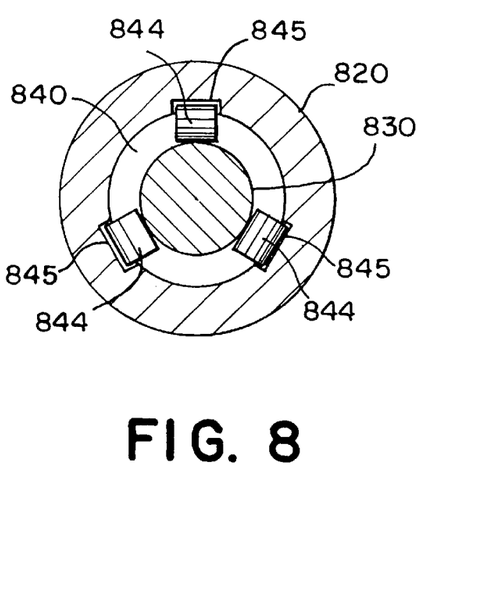

FIG. 8 is a cross-sectional view similar to that of FIG. 7 except that three cylindrical insulating spacers 844 are employed rather than the four cylindrical spacers 444 of FIG. 5. Cylindrical insulating spacers 844 reside in cylindrical arcuate cavities 845 in the interior surface of outer electrode 820 and are disposed in annular cavity 840 formed between outer electrode 820 and inner electrode 830. Spacers 844 preferably have diameters greater than the radial dimension of annular cavity 840 and arcuate cavities 845 preferably have a radius of curvature greater than the radius of spacers 844.

Inner electrode segments and outer electrode segments are preferably machined from a billet of graphite material into the shape required. Arcuate cavities are ground or machined therein. Segments of the outer electrode are threaded together and segments of the inner electrodes are inserted therein and threaded together. Insulating spacers are inserted into the arcuate cavities as the inner electrode is being inserted into the hollow cylindrical cavity of the outer electrode. In a typical application, between two and five segments of each electrode may be employed, depending upon the diameter and the size of the furnace. For a typical application, such as that shown in FIG. 1, the electrodes and other elements may have the following sizes:

Inner electrode:
   length=>12 feet
   outside diameter=7 inches
   number of sections=3
Outer electrode:
   length=12 feet
   outside diameter=16 inches
   inside diameter=10 inches
   Number of sections=3
Annular gap (d)=1½ inches The diameter of the inner and outer electrodes are selected based upon the power required for the process, the total current flow and the desired "current density" (amperes/square inch of electrode cross-section). While it may be desirable to have the same current density in both inner and outer electrodes, it is not necessary to do so. The outer electrode wall thickness is preferably at least three inches, but may be less.

The range of the annular gap dimension is selected using the equation:

$$G_r = W_o(D_i/D_o) \pm 0.125$$

where:

$G_r$=Predicted annular gap range (in inches)

$W_o$=Outer electrode wall thickness (in inches)

$D_i$=Inner electrode outside diameter (in inches)

$D_o$=Outer electrode outside diameter (in inches)

Exemplary annular gap dimensions are set forth in Table 1 below.

TABLE 1

| Annular Gap, inches | Inner Electrode Diameter, inches | Outer Electrode Diameter, inches | Outer Electrode Wall Thickness, inches | $G_r$ Predicted annular gap range, inches |
|---|---|---|---|---|
| 1.000 | 4 | 12 | 3.000 | 0.875–1.125 |
| 1.125 | 4 | 12 | 2.875* | 0.833–1.083 |
| 1.250 | 4 | 12 | 2.750* | 0.792–1.042 |
| 1.375 | 4 | 12 | 2.625* | 0.750–1.000 |
| 1.500 | 4 | 12 | 2.500* | 0.708–0.958 |
| 1.625 | 4 | 12 | 2.375* | 0.667–0.917 |
| 1.750 | 4 | 12 | 2.250* | 0.625–0.875 |
| 1.875 | 4 | 12 | 2.125* | 0.583–0.833 |
| 2.000 | 4 | 12 | 2.000* | 0.542–0.792 |
| 1.000 | 7 | 16 | 3.500 | 1.406–1.656 |
| 1.125 | 7 | 16 | 3.375 | 1.352–1.602 |
| 1.250 | 7 | 16 | 3.250 | 1.297–1.547 |
| 1.375 | 7 | 16 | 3.125 | 1.242–1.492 |
| 1.500 | 7 | 16 | 3.000 | 1.188–1.438 |
| 1.625 | 7 | 16 | 2.875* | 1.133–1.383 |
| 1.750 | 7 | 16 | 2.750* | 1.078–1.328 |
| 1.875 | 7 | 16 | 2.625* | 1.023–1.273 |
| 2.000 | 7 | 16 | 2.500* | 0.969–1.219 |
| 1.000 | 12 | 22 | 4.000 | 2.057–2.307 |
| 1.125 | 12 | 22 | 3.875 | 1.989–2.239 |
| 1.250 | 12 | 22 | 3.750 | 1.920–2.170 |
| 1.375 | 12 | 22 | 3.625 | 1.852–2.102 |
| 1.500 | 12 | 22 | 3.500 | 1.784–2.034 |
| 1.625 | 12 | 22 | 3.375 | 1.716–1.966 |
| 1.750 | 12 | 22 | 3.250 | 1.648–1.898 |
| 1.875 | 12 | 22 | 3.125 | 1.580–1.830 |
| 2.000 | 12 | 22 | 3.000 | 1.511–1.761 |

An asterisk ("*") in Table 1 indicates an outer electrode wall thickness that is less than three inches.

In theory, either or both of the inner and outer electrodes can have a groove or cavity machined into it for "retaining" the spacer ball or rod. It is preferred that the dimension of the insulating spacer ball be selected so that only about 10%–15% of the electrode diameter or wall thickness is cut away by the groove or cavity. Exemplary groove dimensions are set forth for exemplary annular gap dimensions in Table 2 below including the example of a 1.5" annular gap set forth above.

TABLE 2

| Annular Gap, inches | Inner Electrode Diameter, inches | Outer Electrode Diameter, inches | Outer Electrode Wall Thickness, inches | Insulating Spacer Ball Diameter, inches | Depth of Groove in Electrode Wall, inches | Width of Groove in Electrode Wall, inches | Depth of Groove, Inner/Outer, percent |
|---|---|---|---|---|---|---|---|
| 1.000 | 4 | 12 | 3.000 | 2.000 | 0.500 | 1.732 | 25.0/16.7 |
| 1.375 | 7 | 16 | 3.125 | 2.750 | 0.688 | 2.382 | 19.6/22.5 |
| 1.750 | 12 | 22 | 3.250 | 3.500 | 0.875 | 3.031 | 14.7/26.9 |
| 1.000 | 4 | 12 | 3.000 | 2.000 | 0.500 | 1.732 | 25.0/16.7 |

TABLE 2-continued

| Annular Gap, inches | Inner Electrode Diameter, inches | Outer Electrode Diameter, inches | Outer Electrode Wall Thickness, inches | Insulating Spacer Ball Diameter, inches | Depth of Groove in Electrode Wall, inches | Width of Groove in Electrode Wall, inches | Depth of Groove, Inner/Outer, percent |
|---|---|---|---|---|---|---|---|
| 1.375 | 7 | 16 | 3.125 | 2.375 | 0.500 | 1.936 | 14.3/16.0 |
| 1.750 | 12 | 22 | 3.250 | 2.750 | 0.500 | 2.121 | 8.3/25.4 |
| 1.000 | 4 | 12 | 3.500 | 1.750 | 0.375 | 1.436 | 18.8/12.5 |
| 1.375 | 7 | 16 | 3.125 | 2.125 | 0.375 | 1.620 | 10.7/12.0 |
| 1.750 | 12 | 22 | 3.250 | 2.500 | 0.375 | 1.785 | 6.3/11.6 |
| 1.000 | 4 | 12 | 3.555 | 1.600 | 0.250 | 1.118 | 12.5/8.3 |
| 1.375 | 7 | 16 | 3.125 | 1.875 | 0.250 | 1.275 | 7.1/8.0 |
| 1.750 | 12 | 22 | 3.250 | 2.250 | 0.250 | 1.414 | 4.2/7.7 |
| 1.500 | 7 | 16 | 3.000 | 3.000 | 0.750 | 2.598 | 21.4/25.0 |
| 1.500 | 7 | 16 | 3.000 | 2.755 | 0.625 | 2.305 | 17.9/20.8 |
| 1.500 | 7 | 16 | 3.000 | 2.500 | 0.500 | 2.000 | 14.3/16.7 |
| 1.500 | 7 | 36 | 3.000 | 2.250 | 0.375 | 1.677 | 10.7/12.5 |
| 1.500 | 7 | 16 | 3.000 | 2.000 | 0.250 | 1.323 | 7.1/8.3 |

Insulating spacers are machined from a block of ceramic material or are formed and shaped by conventional ceramic processes to the desired size and shape. Other insulating material such as ceramic, ceramic oxides and nitrides made from aluminum, beryllium, boron, calcium, silicon, sodium and zirconium, such as Alumina ($Al_2O_3$) with composition 85% to 99.9% crystalline and amorphous, Silicon Nitride ($Si_3N_4$), Aluminum Nitride (AlN), Beryllium Oxide (BeO), Boron Carbide ($B_4C$), Zirconia ($ZrO_2$), and compositions thereof, may be employed. Selection of the spacer material will depend upon the diameter of the spacer and the temperature of the melt with which it will be employed, so that as the graphite electrodes are consumed and the insulating spacers fall into the melt, the insulating spacers are recycled by melting and become part of the product of the melter operation.

Insulating seals 14, 15, 16, 17 are made of cast ceramics and fiber-base ceramics made of oxides and nitrides as set forth above. Electrically insulating material such as the FIBERFRAX® ceramic fiber material is available commercially from The Carborundum Company located in Niagra Falls, N.Y. Labyrinth seal 56 may be made of insulating material such as alumina oxide or an R-21 mullite material available from ER Advanced Ceramics of East Palestine, Ohio and may also be fabricated of the FIBERFRAX® material. For electrical insulation between outer electrode 20 and inner electrode 30, insulating links 62 and 84 are made of an electrically insulating material such as composite glass/epoxy, composite glass/silicone or composite glass/polyester. Materials for insulating and sealing members are commercially available from Ceradyine, Inc. of Costa Mesa, Calif., National Ceramic Company of Trenton, N.J., and LSP Industrial Ceramics, Inc. of Lambertville, N.J.

In operation, a non-transferred arc may be established between outer electrode 20 and inner electrode 30 by applying a dc potential therebetween preferably with the negative polarity on the outer electrode 20 and the positive polarity on the inner electrode 30. Electrical cables (not shown) are connected, such as by bolts (not shown), to clamp 60 and to clamp 80, respectively, for applying such potential. A voltage of about 50–6,000 volts is required to initiate an arc and the voltage will depend upon a number of factors including the spacing of the electrodes, the temperature of the furnace, the conducting material fed into the furnace to be processed, the relative physical positions of the electrodes and the material to be melted, as the case may be. The arc between the inner and outer electrodes may employed to then heat the melt material. Alternatively, electrode assembly 10 can be placed in contact with the melt material and an arc established between the electrode and the melt material with a return path through the hearth (not shown). In a typical application, a relatively low voltage in the range of 15 volts to 30 volts dc will be required to maintain an arc and a relatively high current, for example, up to 10,000 amperes may flow through the electrodes and the arc.

Figure 9:
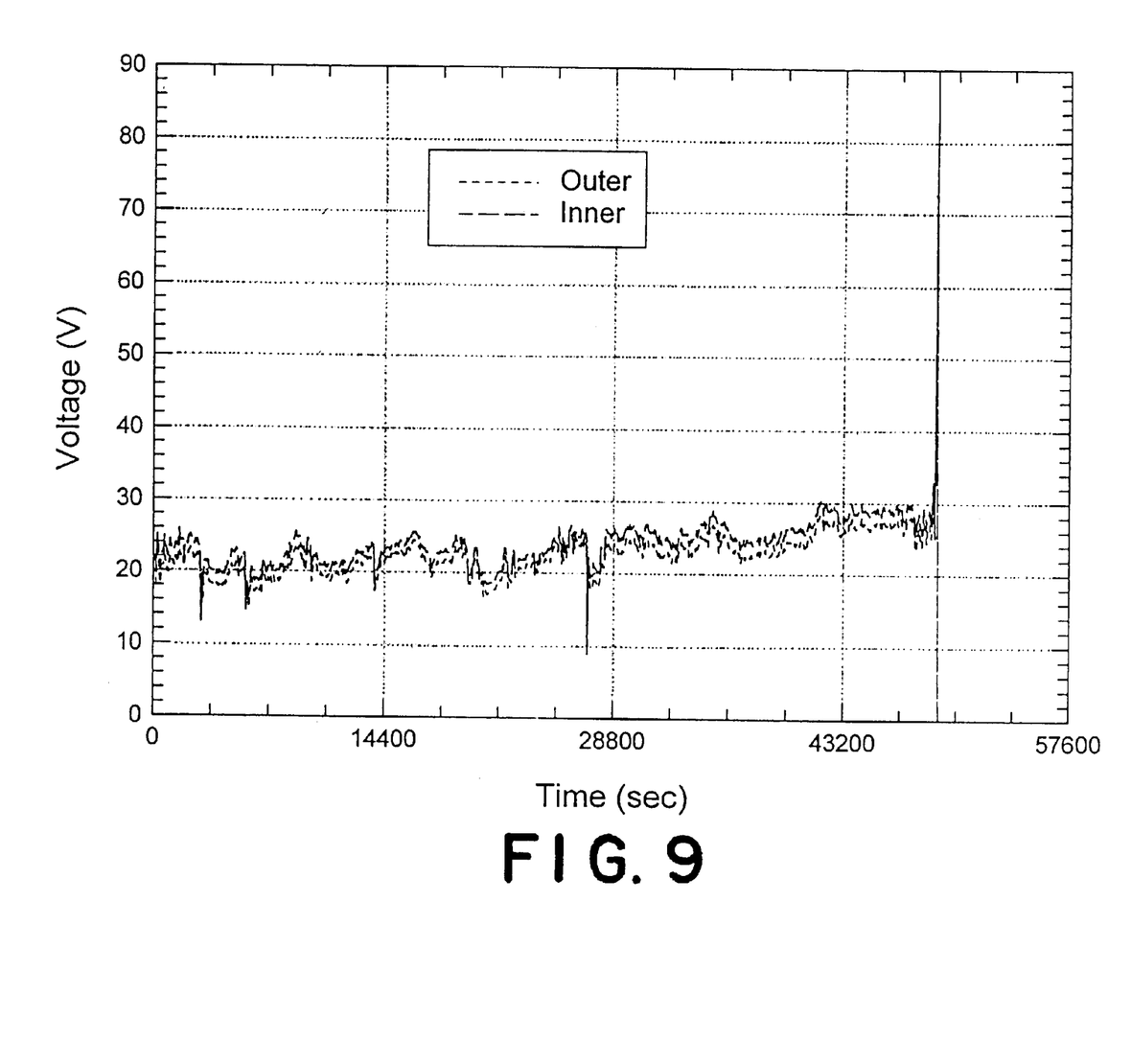
FIGS. 9 and 10 are graphical representations of electrical parameters relating to the embodiment of FIG. 1.
Figure 10:
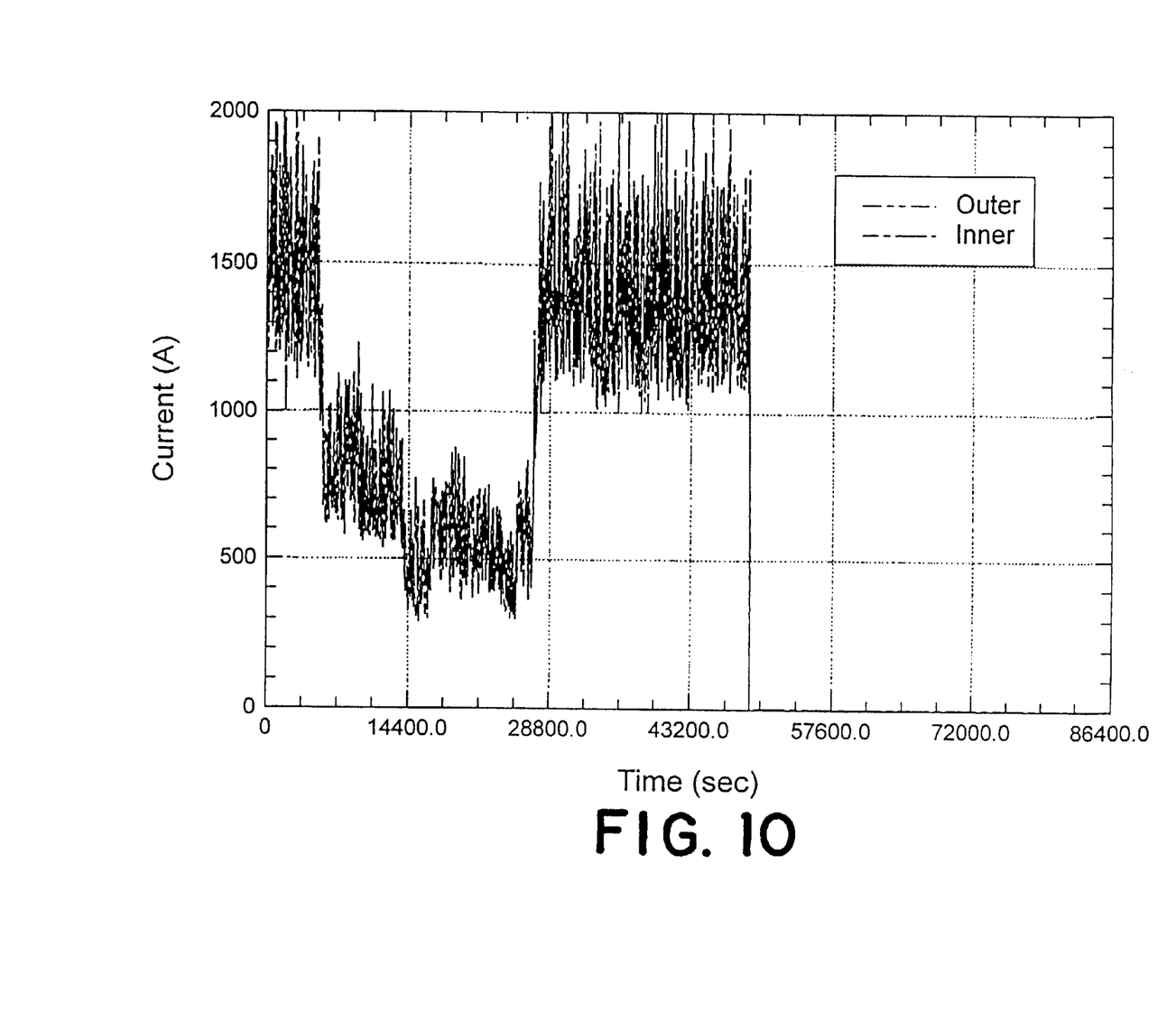

FIG. 9 is a graphical representation of the arc voltage of a typical electrode system over a period of time showing substantial variation due to changes the melt and other operating conditions. Similarly, FIG. 10 is a graphical representation of the arc current flowing in the inner and outer electrodes 30, 20 during a typical operation showing large variations as conditions of the melt and other operating parameters change. The arc current is at times in the range of 1,000–2,000 amperes and at other times in the ranges of 500–1,200 amperes and 300–800 amperes.

As the inner and outer electrodes 20, 30 are consumed, insulating spacers 42, 44, 46, 48 drop into the melt bath and are melted into the melt product.

Figure 11:
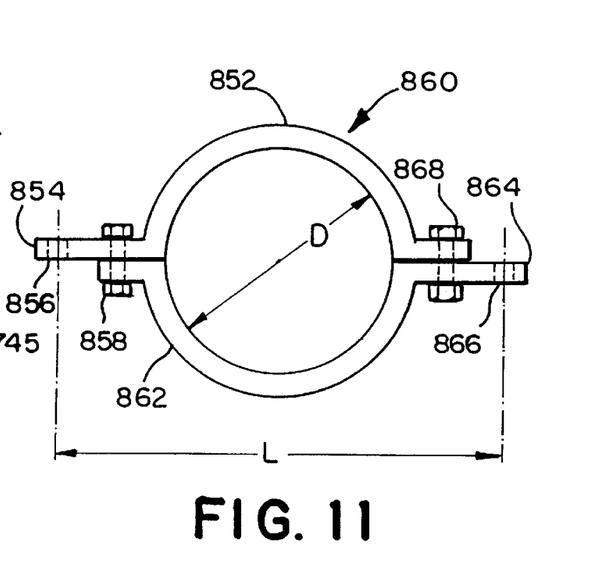
FIG. 11 is a plan view of a lifting sling useful in the assembly of the embodiment of FIGS. 1 and 12.

FIG. 11 is a plan view of an electrode lifting sling useful in lifting electrodes and electrode segments, such as when assembling an electrode assembly or when replacing consumed electrode segments. Lifting sling 860 includes two similar semicircular brackets 852, 862, each having a respective lifting arm 854,864 that extends radially outwardly when brackets 852 and 862 are assembled into lifting sling 860. Lifting sling 860 has an internal diameter D that is sized to be a snug fit on the electrode when bolts and nuts 858 and 868, which fasten brackets 852 and 862 together, are tightened. Thus, for an inner electrode 30 having an outer diameter of 6 inches, diameter D would be slightly less than 6 inches; and for an outer electrode 20 having an outer diameter of 16 inches, diameter D would be slightly less than 16 inches. Lifting arm 854 includes a hole 856 and lifting arm 864 includes a hole 866 through which a lifting device may be attached. The distance L between the lifting holes 858 and 868 is selected to be greater than the outer diameter of the outer electrode 20 irrespective of whether the lifting sling is for lifting an outer electrode 20 or an inner electrode 30.

Figure 12A:
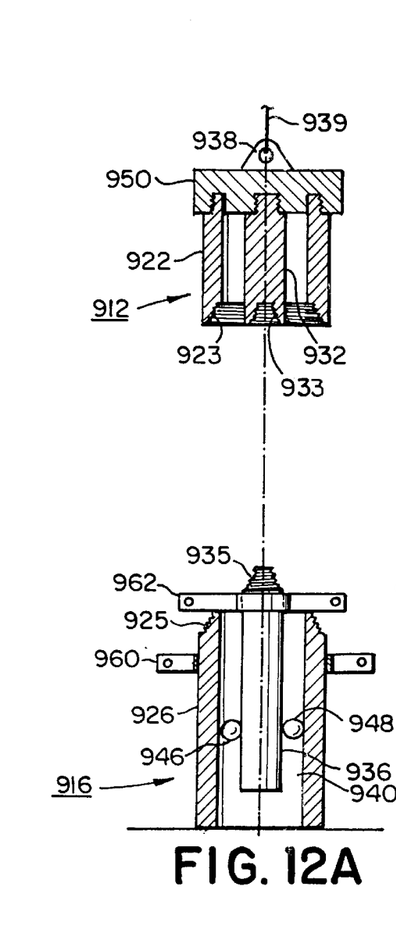
FIGS. 12A through 12F are a series of schematic diagrams, partially cut away and partially sectioned, of an assembly sequence of an embodiment including the present invention.

FIGS. 12A through 12F are a sequence of schematic diagrams of an assembly sequence of a coaxial electrode assembly 910 including the invention. In FIG. 12A, an upper portion of the electrode assembly 910, identified as non-consumable electrode segment stack 912, includes a non-consumable outer electrode segment 922 and a non-consumable inner electrode segment 932 held by having been screwed onto electrode holder 950, which may be similar to that described above in relation to FIG. 1. These electrode segments 922, 932 are referred to as "non-consumable" because the use of the completed electrode assembly will be terminated and additional consumable electrode segments attached to the lower ends of electrode segments 922, 932 before any of the electrode segments 922, 932 are consumed. Non-consumable outer and inner electrode segments 922, 932 have respective tapered threads 923, 933 at their respective lower ends for engaging the consumable electrode segment that will be immediately below them in the completed electrode assembly 910. Electrode holder 950 and electrode segments 922, 932 are held by a lifting device, such as a crane or a hoist or a "come-along" 939, attached to lifting eye 938 of electrode holder 950.

A consumable electrode segment stack 916 including a consumable outer electrode segment 926 having a consumable inner electrode segment 936 inserted coaxially therein is assembled and moved beneath electrode holder 950. Consumable outer electrode segment 926 has an outer electrode lifting sling 960 attached thereto near its upper end. Similarly, inner electrode segment 936 has an inner electrode lifting sling 962 attached thereto near its upper end. Inner electrode segment 936 is lifted by a lifting device (not shown) attached to lifting sling 962 and is lowered within outer electrode segment 926 until it is supported by lifting sling 962 resting on the top of outer electrode segment 926. Outer and inner electrode segments 926, 936 have respective tapered threads 925, 935 at their respective upper ends for engaging the electrode segment that will be immediately above them in the completed electrode assembly 910.

Insulating spacers 946, 948 are inserted into the annular cavity between inner electrode segment 936 and outer electrode segment 926 as inner electrode segment 936 is inserted within outer electrode segment 926. If the arcuate cavities (not visible in FIGS. 12A through 12F) are formed in the outer surface of inner electrode segment 936, then the insulating spacers 946, 948 may be placed into the arcuate cavities manually just before the arcuate cavities descend to be within the hollow interior of outer electrode segment 926 as inner electrode segment 936 is lowered therein. Insulating spacers 946, 948 may be held therein manually until the arcuate cavities are within the interior of outer electrode segment 926. If, on the other hand, the arcuate cavities are formed in the inner surface of outer electrode segment 926, then the insulating spacers 946, 948 are placed into the arcuate cavities before inner electrode segment 936 is inserted into the hollow interior of outer electrode segment 926. Insulating spacers 946, 948 may be suspended, such as by a wire, cable or rope, to remain in their respective arcuate cavities as inner electrode segment 936 is lowered into interior of outer electrode segment 926 to the point where its lower end is lower than the position of insulating spacers 946, 948.

Figures 12B, 12C:
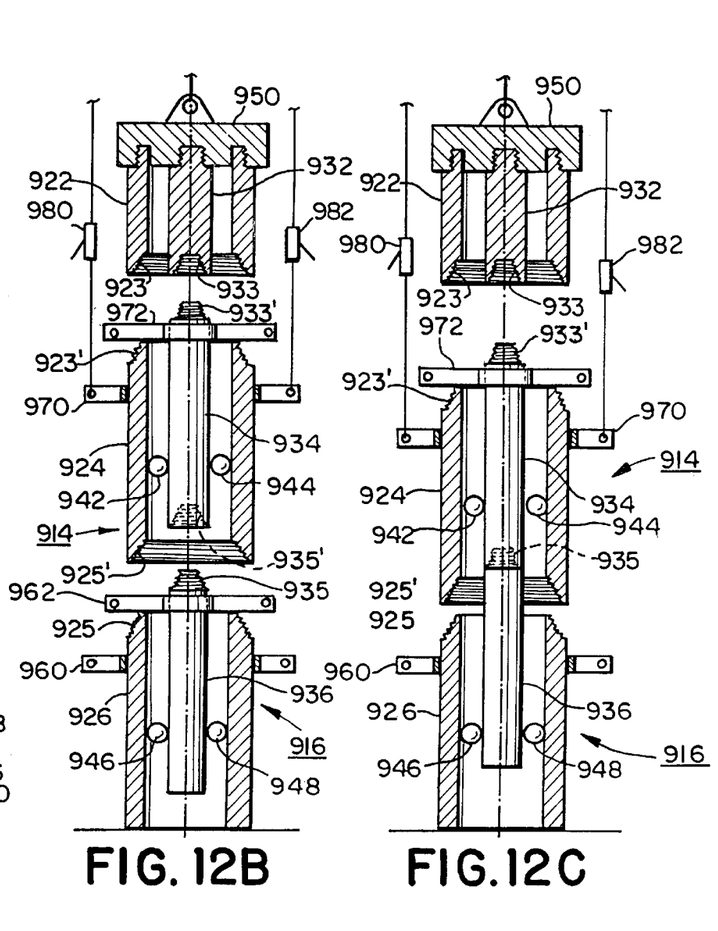

In FIG. 12B, a second coaxial electrode segment stack 914 suspended by lifting devices 980, 982 respectively attached to lifting sling 970 is moved into position between the non-consumable electrode segment stack 912 and consumable electrode segment stack 916. Consumable electrode stack 914 includes consumable outer and inner electrode segments 924, 934 having respective tapered threads 923', 925' and 933', 935' at their respective upper and lower ends, insulating spacers 944, 946, and lifting slings 970, 972. Consumable electrode segment stack 914 is assembled in like manner to electrode stack 916 described above. Lifting devices 980, 982 are then employed to lower electrode segment stack 914 until the tapered threads 935, 935' of inner electrode segments 934, 936, respectively, engage and are threaded together. Lifting slings 962 and 972 may be employed for rotating one or both of inner electrode segments 934, 936 for engaging their tapered threads, after which lifting sling 962 is removed from inner electrode segment 936. Inner electrode segments 934, 936 are now supported by lifting sling 972 resting on the upper end of outer electrode segment 924, as shown in FIG. 12C.

Figure 12D:
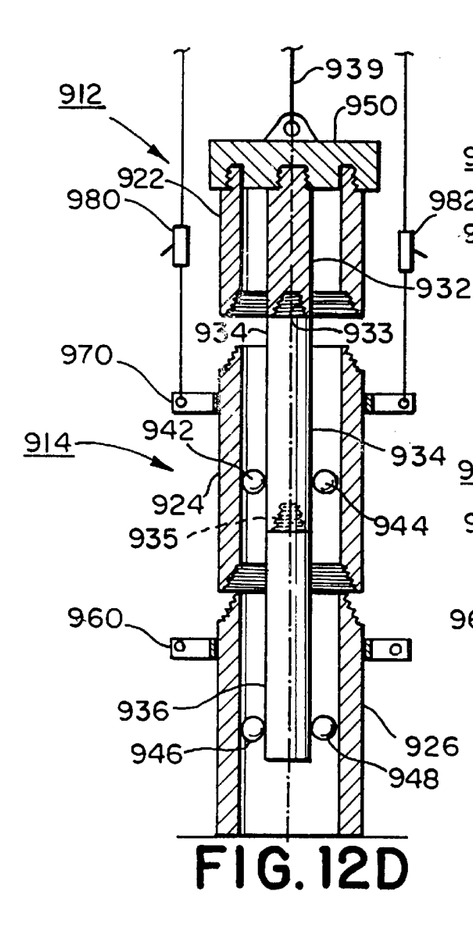

As shown in FIG. 12D, lifting devices 980, 982 are employed to lift electrode segment stack 914 until the tapered threads 933, 933' of inner electrode segments 932 and 934, respectively, engage and are threaded together. Lifting sling 972 may be employed for rotating inner electrode segment 934 for engaging the tapered threads of non-consumable inner electrode 932, after which lifting sling 972 is removed from inner electrode segment 934. Inner electrode segments 934 and 936 are now supported by being suspended from inner electrode segment 932, electrode holder 950 and lifting device 939.

Figure 12E:
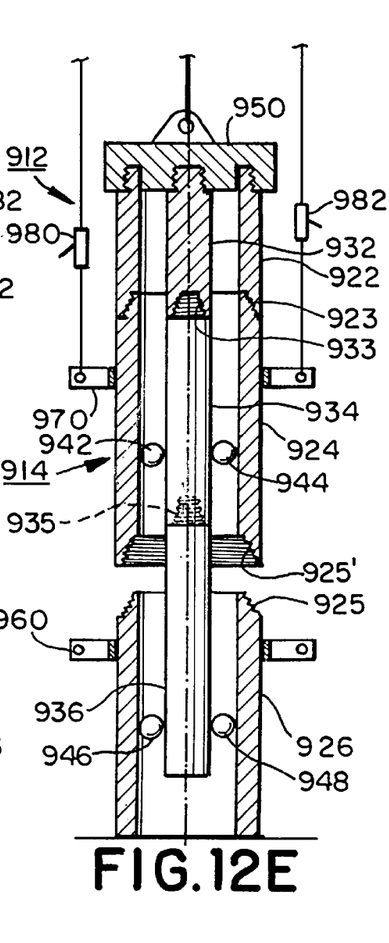
Figure 12F:
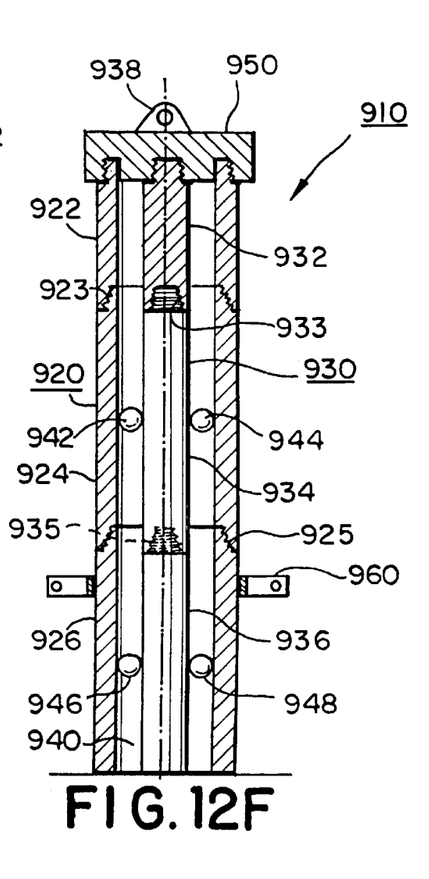

Moving to FIG. 12E, lifting devices 980, 982 are employed to raise outer electrode segment 924 to engage its tapered threads 923' with the tapered threads 923 of non-consumable outer electrode segment 922. Finally, lifting devices 980, 982 and 939 are employed to lower the assembly of electrode segment stacks 912 and 914 until tapered threads 925' of outer electrode segment 924 engage the tapered threads 925 of outer electrode segment 926. A chain wrench may be employed for rotating the outer electrode segments. Electrode assembly 910 is now assembled, as shown in FIG. 12F, and is ready to be inserted into the processing chamber of a melter furnace (not shown). Lifting sling 960 may be removed or may be left in place if desired for ease of moving and orienting electrode assembly 910 as it is installed into the furnace.

As the electrode assembly 910 is used in a furnace, the lower ends of the outer and inner electrodes 920 and 930 will be eroded away or consumed. Before the erosion reaches the threaded joints 923, 933 where consumable electrode segments 924, 934 engage non-consumable electrode segments 922, 932, respectively, electrode assembly 910 is removed from the furnace and the above assembly process is reversed until a new consumable electrode segment stack can be inserted between non-consumable electrode segment stack 912 and consumable electrode segment stack 914. In this manner, electrode segments may be replaced conveniently without disturbing the seals and electrical connections (not shown) to non-consumable electrode segment stack 912.

In any of the above electrode assembly and replacement operations, appropriate safety devices, such as safety chains and cables, blocks, stanchions and other supports, should be employed to protect the safety and health of personnel involved.

While the present invention has been described in terms of the foregoing exemplary embodiments, variations within the scope and spirit of the present invention as defined by the claims following will be apparent to those skilled in the art. For example, with respect to FIG. 8, insulating spacers 743 could be of barrel shape or of elliptical shape and could be positioned in correspondingly shaped arcuate cavities formed in the outer surface of inner electrode 730. The same substitution could also be made in the arrangement of FIG. 5 or FIG. 6. It is a further alternative that the insulating spacers be positioned in respective arcuate cavities formed in the inner surface of outer electrode 20 and arcuate cavities formed in the outer electrode 30.

With respect to FIG. 1, the support of electrode assembly 10 may employ a plurality of threaded drive rods 74 engaging a plurality of yokes 70 spaced about radially from electrode assembly 10. Either two, three or four supporting rods are satisfactory. When plural threaded drive rods 74 are employed, the plural threaded drive rods 74 are preferably driven or rotated by a single motor (not shown) coupled through a gearing arrangement (not shown) so that each of the plural threaded rods 74 rotates in the same direction and by the same amount as do the other plural threaded rods 74. Alternatively, a rack and pinion drive may be employed for inserting and withdrawing electrode assembly 10 from the furnace.

If the inner and outer electrode 30, 20 were to be operated at the same potential to establish arcs between both electrodes and the melt material, then spacers 42, 44, 46, 48 of FIG. 1 (as well as similar spacers shown in FIGS. 2–8) need not insulate inner electrode 30 from outer electrode 20 and may be made of non-insulating material, for example, graphite. The inner and outer electrodes need not have the same length, and in most cases will be of different lengths, as reflected in FIG. 1.

What is claimed is:

1. An electrode assembly comprising:
    a first electrode comprising a hollow cylinder;
    a second electrode comprising a cylinder and positioned coaxially within said first electrode, said first and second electrodes thereby defining an annular cavity therebetween; and
    means for maintaining said first electrode substantially coaxial with said second electrode including a plurality of spacers having a circular cross-section and disposed between said first and second electrodes in said annular cavity.

2. The electrode assembly of claim 1 wherein said means for maintaining further includes a plurality of arcuate engaging features on an inner surface of said first electrode and adapted for receiving ones of said spacers.

3. The electrode assembly of claim 2 wherein said spacers are disposed substantially in a plane.

4. The electrode assembly of claim 3 wherein said plane is substantially perpendicular to a central axis of said first electrode.

5. The electrode assembly of claim 2 wherein said engaging features are evenly spaced about said first electrode.

6. The electrode assembly of claim 2 wherein said arcuate engaging features have a radius of curvature that is greater than one half the diameter of the circular cross-section of said spacers.

7. The electrode assembly of claim 1 wherein said means for maintaining further includes a plurality of arcuate engaging features on an outer surface of said second electrode and adapted for receiving ones of said spacers.

8. The electrode assembly of claim 7 wherein said spacers are disposed substantially in a plane.

9. The electrode assembly of claim 8 wherein said plane is substantially perpendicular to a central axis of said second electrode.

10. The electrode assembly of claim 7 wherein said engaging features are evenly spaced about said second electrode.

11. The electrode assembly of claim 7 wherein said arcuate engaging features have a radius of curvature that is greater than one half the diameter of the circular cross-section of said spacers.

12. The electrode assembly of claim 1 wherein said spacers are spherical.

13. The electrode assembly of claim 1 wherein said spacers are cylindrical.

14. The electrode assembly of claim 1 wherein said spacers are of an insulating material.

15. The electrode assembly of claim 14 wherein said insulating material is a material selected from the group consisting of ceramic, ceramic oxides and nitrides of aluminum, beryllium, boron, calcium, silicon, sodium and zirconium, and boron carbide.

16. The electrode assembly of claim 1 wherein said spacers have a diameter that is greater than a radial dimension of said annular cavity.

17. The electrode assembly of claim 1 wherein said second electrode is moveable axially in relation to said first electrode.

18. The electrode assembly of claim 17 wherein said plurality of spacers have their respective circular cross-sections oriented for being rollable when said second electrode moves axially in relation to said first electrode.

19. A coaxial electrode assembly as for an arc furnace comprising:
    a hollow electrode having an interior cylindrical surface and a length, and having a plurality of arcuate cavities in the interior surface thereof, said arcuate cavities being spaced apart from each other proximate an axial position along the length of said hollow electrode;
    a second electrode having an exterior cylindrical surface and a length, said second electrode being positioned coaxially within said hollow electrode thereby defining an annular cavity between the interior cylindrical surface of said hollow electrode and the exterior cylindrical surface of said second electrode having a radial dimension; and
    a plurality of insulating spacers having a circular cross-section with a diameter greater than the radial dimension of said annular cavity, wherein ones of said plurality of insulating spacers are disposed in ones of said arcuate cavities and in said annular cavity, whereby said insulating spacers maintain said second electrode in coaxial relationship with said hollow electrode.

20. The coaxial electrode assembly of claim 19 wherein said insulating spacers are spherical.

21. The coaxial electrode assembly of claim 20 wherein said arcuate cavities have a surface that is a portion of a spherical surface.

22. The coaxial electrode assembly of claim 19 wherein said insulating spacers are cylindrical.

23. The coaxial electrode assembly of claim 22 wherein said arcuate cavities have a surface that is a portion of a surface of a cylinder having a central axis.

24. The coaxial electrode assembly of claim 23 wherein the central axis of said cylinder is orthogonal to both radial and axial directions of said hollow electrode.

25. The coaxial electrode assembly of claim 19 wherein said insulating spacers are formed of a material selected from the group consisting of ceramic, ceramic oxides and nitrides of aluminum, beryllium, boron, calcium, silicon, sodium and zirconium, and boron carbide.

26. The coaxial electrode assembly of claim 19 wherein said hollow electrode includes a plurality of hollow electrode segments.

27. The coaxial electrode assembly of claim 26 wherein ones of said hollow electrical electrode segments include ones of said plurality of arcuate cavities on the interior surface thereof.

28. The coaxial electrode assembly of claim 26 wherein said ones of said plurality of arcuate cavities are proximate one end of said ones of said hollow electrode segments.

29. The coaxial electrode assembly of claim 26 wherein ones of said hollow electrode segments include internal threads at one end of thereof and external threads at an other end thereof, wherein said internal threads and said external threads are sized for engaging each other.

30. The coaxial electrode assembly of claim 29 wherein said internal threads and said external threads are tapered.

31. The coaxial electrode assembly of claim 19 wherein said second electrode includes a plurality of second electrode segments.

32. The coaxial electrode assembly of claim 31 wherein ones of said second electrode segments include internal threads at one end of thereof and external threads at an other end thereof, wherein said internal threads and said external threads are sized for engaging each other.

33. The coaxial electrode assembly of claim 32 wherein said internal threads and said external threads are tapered.

34. The coaxial electrode assembly of claim 19 wherein the arcuate cavities have a radius of curvature that is greater than one half the diameter of said insulating spacers.

35. The electrode assembly of claim 19 wherein said second electrode is moveable axially in relation to said hollow electrode.

36. The electrode assembly of claim 35 wherein said plurality of insulating spacers have their respective circular cross-sections oriented for being rollable when said second electrode moves axially in relation to said first electrode.

37. A coaxial electrode assembly as for an arc furnace comprising:
a hollow electrode having an interior cylindrical surface and a length;
a second electrode having an exterior cylindrical surface and a length, and having a plurality of arcuate cavities in the exterior surface thereof, said arcuate cavities being spaced apart from each other proximate an axial position along the length of said second electrode, said second electrode being positioned coaxially within said hollow electrode thereby defining an annular cavity between the interior cylindrical surface of said hollow electrode and the exterior cylindrical surface of said second electrode having a radial dimension; and
a plurality of insulating spacers having a circular cross-section with a diameter greater than the radial dimension of said annular cavity, wherein ones of said plurality of insulating spacers are disposed in ones of said arcuate cavities and in said annular cavity, whereby said insulating spacers maintain said second electrode in coaxial relationship with said hollow electrode.

38. The coaxial electrode assembly of claim 37 wherein said insulating spacers are spherical.

39. The coaxial electrode assembly of claim 38 wherein said arcuate cavities have a surface that is a portion of a spherical surface.

40. The coaxial electrode assembly of claim 37 wherein said insulating spacers are cylindrical.

41. The coaxial electrode assembly of claim 40 wherein said arcuate cavities have a surface that is a portion of a surface of a cylinder having a central axis.

42. The coaxial electrode assembly of claim 41 wherein the central axis of said cylinder is orthogonal to both radial and axial directions of said second electrode.

43. The coaxial electrode assembly of claim 37 wherein said insulating spacers are formed of a material selected from the group consisting of ceramic, ceramic oxides and nitrides of aluminum, beryllium, boron, calcium, silicon, sodium and zirconium, and boron carbide.

44. The coaxial electrode assembly of claim 37 wherein said second electrode includes a plurality of second electrode segments.

45. The coaxial electrode assembly of claim 44 wherein ones of said second electrical electrode segments include ones of said plurality of arcuate cavities on the exterior surface thereof.

46. The coaxial electrode assembly of claim 44 wherein said ones of said plurality of arcuate cavities are proximate one end of said ones of said second electrode segment.

47. The coaxial electrode assembly of claim 44 wherein ones of said second electrode segments include internal threads at one end of thereof and external threads at an other end thereof, wherein said internal threads and said external threads are sized for engaging each other.

48. The coaxial electrode assembly of claim 47 wherein said internal threads and said external threads are tapered.

49. The coaxial electrode assembly of claim 37 wherein said hollow electrode includes a plurality of hollow electrode segments.

50. The coaxial electrode assembly of claim 49 wherein ones of said hollow electrode segments include internal threads at one end of thereof and external threads at an other end thereof, wherein said internal threads and said external threads are sized for engaging each other.

51. The coaxial electrode assembly of claim 50 wherein said internal threads and said external threads are tapered.

52. The coaxial electrode assembly of claim 37 wherein the arcuate cavities have a radius of curvature that is greater than one half the diameter of said insulating spacers.

53. The electrode assembly of claim 37 wherein said second electrode is moveable axially in relation to said hollow electrode.

54. The electrode assembly of claim 53 wherein said plurality of insulating spacers have their respective circular cross-sections oriented for being rollable when said second electrode moves axially in relation to said first electrode.

* * * * *